No. 731,047. PATENTED JUNE 16, 1903.
D. GRAF.
LENS BOARD GUIDE AND HOLDER FOR CAMERAS.
APPLICATION FILED SEPT. 22, 1902.
NO MODEL.
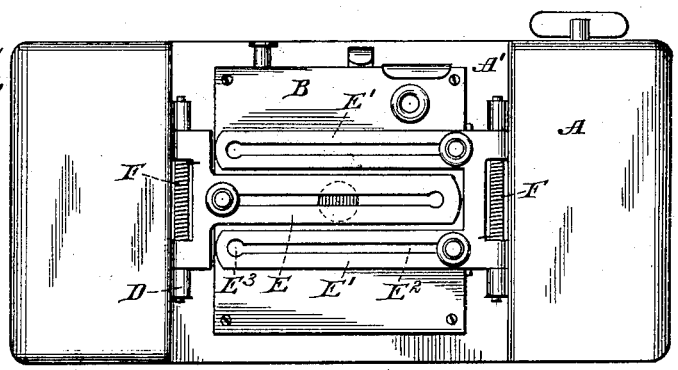
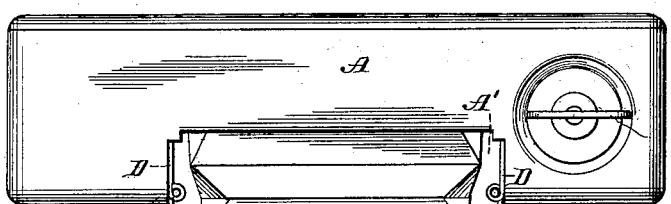
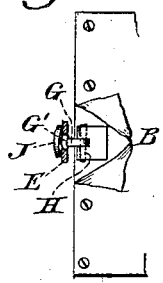
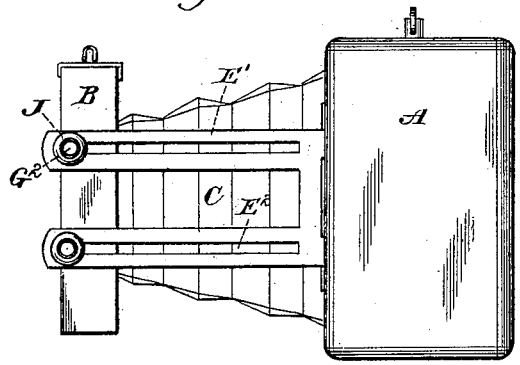
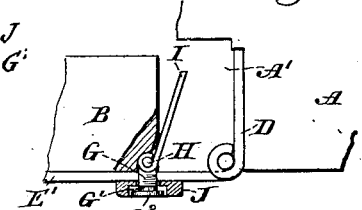
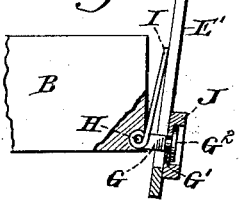
Witnesses:
John Litka
John A. Kehlenbeck
Inventor
Daniel Graf
by Briesen Knauth
his Attorneys No. 731,047.

Patented June 16, 1903.

UNITED STATES PATENT OFFICE.

DANIEL GRAF, OF DEMAREST, NEW JERSEY.

LENS-BOARD GUIDE AND HOLDER FOR CAMERAS.

SPECIFICATION forming part of Letters Patent No. 731,047, dated June 16, 1903.

Application filed September 22, 1902. Serial No. 124,260. (No model.)

*To all whom it may concern:*

Be it known that I, DANIEL GRAF, a citizen of the United States, residing in Demarest, Bergen county, State of New Jersey, have invented certain new and useful Improvements in Lens-Board Guides and Holders for Cameras, of which the following is a specification.

My invention relates to that class of cameras in which a so-called "front" or "lens" board is movably connected with the body of the camera, generally by a bellows, and has for its object to provide means for guiding the front in its movement toward and from the body of the camera, and particularly for holding the front steady and parallel with the back when the front reaches its position of use.

The invention will now be described in detail with reference to the accompanying drawings, which illustrate one form of my invention, and the novel features will then be pointed out in the appended claims.

Figure 1 is a front view of a camera provided with my improvement with the front in the folded or closed position. Fig. 2 is a top view thereof with the front extended. Fig. 3 is a side view of the camera with the parts in the same position as in Fig. 2. Fig. 4 is a detail top view with parts in section, showing the joint of the guiding and supporting device with the camera-body and with the front upon an enlarged scale. Fig. 5 is a detail view of a portion of the front and the attached end of the guiding device in the position which said device takes when the front is in its extended position, and Fig. 6 is a detail front elevation of a portion of the camera-front with parts in section.

The construction of the camera proper forms no part of my present invention. I have shown a camera-body A, such as is used in film-cameras, and, as represented, this body is cut out at its central portion, as indicated at A', so that the camera-front B may be received within said central recess when the camera is folded, as indicated in Fig. 4. The lens-board or front proper may be constructed in any approved way, except as hereinafter set forth, and is connected with the body A by any suitable extensible connecting structure, such as a bellows C. At the front portions of the recess A' are secured hinges D, to which are pivoted arms E E', which are adapted to guide the front B in its movement and to hold said front steady when it is in its forward position. (Shown in Figs. 2, 3, and 5.) When the front is folded upon the body of the camera, as shown in Figs. 1 and 4, the arms E E' lie flat upon the forward face of the front, and in order that the arms on opposite sides may not interfere with each other I prefer to arrange them in different planes. Thus on one side there may be a bifurcated arm E', while on the other side there is a single arm E, adapted to enter between the members of the arm E', as shown in Fig. 1. Springs F are coiled about the pintles of the hinges D and bear upon the arms E E', with a tendency to hold the said arms in a folded position, as shown in Figs. 1 and 4. The arms E E' are slotted lengthwise, as indicated at $E^2$, and are provided at their free ends with apertures $E^3$, slightly larger than the slots $E^2$. In the slots $E^2$ and apertures $E^3$ are adapted to work pins which have flat portions G of substantially the same width as the slots $E^2$; round portions G', which are of such diameter as to be received within the apertures $E^3$, but not within the slots $E^2$, and heads $G^3$, which are still larger, so that they cannot be received within the apertures $E^3$. These pins are pivotally connected with the front B at H, and are thus adapted to swing about axes which are vertical, and therefore parallel, to the axes of the hinges D, about which the arms E E' swing. Upon the pivot-pins H or adjacent thereto I secure to the front B springs I, which normally—that is, in closed position—do not engage the arms E E', but are adapted to come against these arms as the front is drawn into the forward position. The action of these springs is to force the arms E E' outward or away from each other and firmly against the enlarged portions G' of the pins carried by the front. Thus as soon as the front is drawn sufficiently forward to cause the said pins to register with the enlarged apertures $E^3$ the springs I will cause the said arms to snap outwardly until the enlarged portion G' enters the aperture $E^3$ of the corresponding arm E or E', as shown in Figs. 5 and 6. It will be obvious that when the parts are in this position the front B will be held perfectly steady and that it will be impossible to move the front back by an accidental push upon it, since the portions G' of the pins are larger than the slots E², and therefore cannot enter them. In order to fold the front back against the body, it is therefore necessary to first press the arms E E' toward each other, so that they will be disengaged from the enlarged portions G' of the pins and engaged only with the narrow portions G, which again slide within the slots E². In order to facilitate this pressing together of the arms E E', I have loosely mounted upon the outer end of each pin G a collar J, which is countersunk, as shown best in Figs. 4 and 5, to receive the head G² of the pin and which always is in engagement with the outer surface of the corresponding arm E or E'. The operator can then readily fold the camera by resting the thumb of his right hand against that collar J which is shown at the left in Fig. 1, while two fingers of the right hand are engaged with the two collars shown at the right in Fig. 1. A slight pressure of the thumb toward the fingers will bring the arms E E' inward, so as to make them register with the flat portion G of the pins, and then a pressure toward the body of the camera (which is held in the left hand) will bring the front back to the folded position, and at the last stage of this movement the springs F will suffice to fold the front back against the body.

While I have shown the body of the camera as provided with a recess to receive the front and while such construction is preferable on account of its great compactness, it is not absolutely necessary. I desire it to be clearly understood that various modifications may be made without departing from the nature of my invention.

What I claim as new, and desire to secure by Letters Patent, is—

1. The combination of a camera-body, a front movable relatively thereto, and a light-tight connection between the body and the front, with arms hinged to the body and pins hinged to the front about axes parallel to the hinges of the arms, said pins having a sliding engagement with said arms.

2. The combination of a camera-body, a front movable relatively thereto, arms hinged to the body at opposite sides and adapted to fold over the front, and pins pivoted to the front about axes parallel to the hinges of the arms, said pins having sliding engagement with said arms.

3. The combination with the camera-body, and the front movable relatively thereto, of arms pivoted to the body and having longitudinal sliding engagement with the front at opposite sides thereof, the arms on opposite sides of the front being arranged to swing in different paths so that they may lie side by side when folded against the front.

4. The combination of the camera-body, the front movable relatively thereto, longitudinally-slotted arms pivoted to the body and provided with enlarged apertures at the outer ends of their slots, pins secured to the front and provided with portions of substantially the same width as the slots of the arms, and with other portions adapted to enter the said enlarged apertures of the arms, and springs arranged to press the arms outward so as to lock them by engagement with the enlarged portions of the pins.

5. The combination of the camera-body, the front movable relatively thereto, arms hinged to the body and provided with longitudinal slots having enlargements at their outer ends, pins pivoted to the front, and having narrow portions adapted to move in the slots of said arms, and enlarged portions arranged to engage the apertures at the ends of the slots, and springs carried by the front and arranged to press the arms outward when the front is in its forward position.

6. The combination of the camera-body, the front movable relatively thereto, arms pivoted to the body, pins pivotally secured to the front and having guiding engagement with the said arms, and means for locking the arms to the front when the latter is in its forward position.

7. The combination of the camera-body, the front movable relatively thereto, arms pivoted to the body, pins pivotally secured to the front and having guiding engagement with the said arms, means for locking the arms to the front when the latter is in its forward position, and means for releasing the front.

8. The combination with the camera-body and the front movable relatively thereto, of arms pivoted to the body and provided with longitudinal slots having enlargements at their outer ends, pins pivoted to the front and having flat portions arranged for engagement with said slots, and enlarged portions arranged for engagement with the apertures at the ends of the slots, springs adapted to throw the arms outward when the front is in its forward position, and collars mounted upon the said pins and engaging the arms to press the latter inward against the tension of the said springs.

9. The combination of the camera-body, the front movable relatively thereto, arms pivotally connected with the body and with the front, and springs for pressing said arms toward each other and holding the front against the body in the folded condition of the camera.

10. In a camera, the combination with the camera-body and a movable front, of arms extending at opposite sides of the front and having a permanent engagement therewith during the movement of the front from its folded to its projected position, said arms being mounted to swing transversely of the front.

In testimony whereof I have signed my name to this specification in the presence of two subscribing witnesses.

DANIEL GRAF.

Witnesses:
 JOHN LOTKA,
 EUGENE EBLE.